US011731512B2

(12) United States Patent
Helot et al.

(10) Patent No.: US 11,731,512 B2
(45) Date of Patent: Aug. 22, 2023

(54) DISPLAY APPARATUS FOR A MOTOR VEHICLE, AND MOTOR VEHICLE

(71) Applicant: AUDI AG, Ingolstadt (DE)

(72) Inventors: Jacques Helot, Ingolstadt (DE); Ulrich Mueller, Ingolstadt (DE); Immo Redeker, Ingolstadt (DE); Joris Mertens, Ingolstadt (DE); Anna Hufnagel, Munich (DE)

(73) Assignee: AUDI AG, Ingolstadt (DE)

( * ) Notice: Subject to any disclaimer, the term of this patent is extended or adjusted under 35 U.S.C. 154(b) by 75 days.

(21) Appl. No.: 17/051,591

(22) PCT Filed: Mar. 20, 2019

(86) PCT No.: PCT/EP2019/056924
§ 371 (c)(1),
(2) Date: Oct. 29, 2020

(87) PCT Pub. No.: WO2019/211039
PCT Pub. Date: Nov. 7, 2019

(65) Prior Publication Data
US 2021/0138902 A1 May 13, 2021

(30) Foreign Application Priority Data
Apr. 30, 2018 (DE) ...................... 10 2018 206 656.6

(51) Int. Cl.
*G06F 3/01* (2006.01)
*G09G 5/38* (2006.01)
(Continued)

(52) U.S. Cl.
CPC .............. *B60K 35/00* (2013.01); *G06F 3/013* (2013.01); *G09G 5/30* (2013.01); *G09G 5/38* (2013.01);
(Continued)

(58) Field of Classification Search
CPC ............ B60K 2370/27; B60K 2370/52; G09G 2354/00; G09G 2380/10
See application file for complete search history.

(56) References Cited

U.S. PATENT DOCUMENTS 9,605,984 B2 3/2017 Farell
2002/0183921 A1 12/2002 Sugiyama et al.
(Continued)

FOREIGN PATENT DOCUMENTS

CN 104635338 A 5/2015
CN 104965338 A 10/2015
(Continued)

OTHER PUBLICATIONS

International Search Report dated May 21, 2019 of International Application No. PCT/EP2019/056924, 4 pages.
(Continued)

*Primary Examiner* — Grace Q Li
(74) *Attorney, Agent, or Firm* — Staas & Halsey LLP (57) ABSTRACT

A display panel for displaying at least one graphical display object and a control device are part of a display apparatus in a motor vehicle. The display panel is freestanding in a space and has a multiplicity of predetermined sections, each having a settable degree of light transmittance. As a result, an environment of the display panel may be visible in the display panel, depending on the degree of light transmittance. The control device is configured to individually set a respective light transmittance to a predetermined degree for each of the multiplicity of predetermined sections of the display panel.

18 Claims, 7 Drawing Sheets

(51) Int. Cl.
  *G09G 5/30* (2006.01)
  *B60K 35/00* (2006.01)

(52) U.S. Cl.
  CPC .... *B60K 2370/152* (2019.05); *B60K 2370/27* (2019.05); *B60K 2370/52* (2019.05); *G09G 2354/00* (2013.01); *G09G 2380/10* (2013.01)

(56) References Cited

U.S. PATENT DOCUMENTS

| | | | | |
|---|---|---|---|---|
| 2006/0238327 | A1* | 10/2006 | Repetto | G02B 27/01 340/461 |
| 2008/0048932 | A1* | 2/2008 | Yanagisawa | G01C 21/36 345/9 |
| 2014/0226110 | A1 | 8/2014 | Doyle et al. | |
| 2015/0123997 | A1* | 5/2015 | Hayasaka | G02B 27/0101 345/633 |
| 2015/0371579 | A1* | 12/2015 | Yu | G09G 3/20 345/690 |
| 2017/0212398 | A1* | 7/2017 | Cao | G02F 1/133377 |
| 2019/0315275 | A1* | 10/2019 | Kim | B60R 1/00 |
| 2020/0225474 | A1* | 7/2020 | Shim | G06F 3/011 |

FOREIGN PATENT DOCUMENTS

| | | | | |
|---|---|---|---|---|
| DE | 10 2007 005 028 A1 | 8/2008 | | |
| DE | 103 40 028 B4 | 7/2009 | | |
| DE | 10 2010 055 144 A1 | 6/2012 | | |
| DE | 10 2015 011 377 A1 | 3/2017 | | |
| DE | 10 2015 219 787 A1 | 4/2017 | | |
| DE | 10 2018 206 656.6 | 4/2018 | | |
| JP | 2002356118 A * | 12/2002 | ............. | B60K 37/02 |
| JP | 6911868 B2 * | 7/2021 | ............. | B60K 35/00 |
| KR | 200339113 Y1 * | 1/2004 | | |
| WO | 2014/008903 A1 | 1/2014 | | |
| WO | PCT/EP2019/056924 | 3/2019 | | |

OTHER PUBLICATIONS

German Office Action dated Dec. 10, 2018 from German Application No. 10 2018 206 656.6, 8 pages.
Translation dated Nov. 12, 2020 of International Preliminary Report on Patentability, dated Nov. 3, 2020 and Written Opinion dated May 21, 2019 for International Application No. PCT/EP2019/056924, 7 pages.
Chinese Office Action dated Apr. 21, 2023 for Chinese Application No. 201980029080.4.

* cited by examiner

DISPLAY APPARATUS FOR A MOTOR VEHICLE, AND MOTOR VEHICLE

CROSS REFERENCE TO RELATED APPLICATIONS

This application is a U.S. national stage of International Application No. PCT/EP2019/056924, filed on Mar. 20, 2019. The International Application claims the priority benefit of German Application No. 10 2018 206 656.6 filed on Apr. 30, 2018. Both the International Application and the German Application are incorporated by reference herein in their entirety.

BACKGROUND

Described below is a display apparatus for a motor vehicle and a motor vehicle having such a display apparatus.

Display apparatuses, for example display screens, touchscreens or displays, nowadays belong as standard to the equipment of a motor vehicle. In this case, a display apparatus is usually used as a user interface between a user and the motor vehicle. Operating functions or driver assistance functions of the motor vehicle can therefore be made available to the user for selection. A display apparatus is also used to display vehicle-relevant functions, for example a display of a combination instrument or a function selected in an infotainment system. Current display apparatuses are usually integrated inside a dashboard or inside a center console of the motor vehicle. With an increasing number of operating and comfort functions available for selection for the user in the motor vehicle, it becomes necessary to make it possible to easily operate these functions, on the one hand, and to present a multiplicity of different items of information in a clear manner, on the other hand. In addition, as a result of increasing use of an autonomous driving mode in the motor vehicle, the need for display area of the display apparatus increases, with the result that a loss of actual space and a loss of space subjectively perceived by a vehicle occupant in the interior of the motor vehicle are associated with this.

SUMMARY

Described below is a display apparatus for a motor vehicle which provides a clear display of display contents and makes it possible for the display apparatus to be arranged in the motor vehicle with as little loss of space as possible in an interior of the motor vehicle.

As described below, an optical loss of space which is also perceived by a user in a motor vehicle and is caused by a display apparatus arranged in the latter, for example a screen or a display, results from the fact that the display apparatus in the field of view of a driver partially blocks or obstructs the driver's view of a windshield and/or another space in the motor vehicle by virtue of its size. This is because an environment behind the display apparatus is concealed by this display apparatus in the driver's field of view. If the display apparatus is mounted in front of a windshield in the driver's field of view, some of the traffic events happening behind the windshield can no longer be perceived by the driver. In the case of further possible arrangements in the region of the dashboard, the display apparatus can also distract the driver from looking at the windshield. Furthermore, a particularly large-scale display apparatus can result subjectively in a particularly negative feeling of space in the driver or in a further motor vehicle occupant since the driver or the further motor vehicle occupant can feel impaired and therefore restricted in his personal space by the display apparatus. A distracting effect is likewise exerted on the driver, for example by a multiplicity of displayed display objects or by use of an entire area of the display apparatus to display the display objects.

In order to counteract a restriction of a field of view to the windshield and/or a restriction of a feeling of space of a user of the motor vehicle, a display panel for displaying at least one graphical display object and a control device is configured as described below. The term display panel is used to mean, for example, a consistent, continuous screen or display surface. A graphical display object is used to mean a display image, for example, a pictogram or a so-called icon. The display panel includes a multiplicity of predetermined sections each having a settable degree of light transmittance. For example, the display panel is subdivided into the multiplicity of predetermined sections. The predetermined sections may be, for example, in the form of square and/or rectangular and/or triangular and/or hexagonal areas. Furthermore, the different predetermined sections may have the same shape. However, the different predetermined sections may also have shapes which differ from one another. For example, the different predetermined sections together result in an extensive overall pattern. The predetermined sections can together form a total area of the display panel. For example, the multiplicity of predetermined sections form the total area of the display panel without any gaps. The display panel may be, for example, in the form of a so-called transparent organic light-emitting diode screen (T-OLED) or a so-called "polymer dispersed liquid crystal" screen (PDLC) or a thin-film transistor screen (TFT).

The display panel stands freely in a space. In other words, at least a front side and a rear side of the display panel are exposed in a space. Depending on the degree of light transmittance of the at least one of the multiplicity of predetermined sections, an environment of the display panel is visible in the display panel itself. In other words, light from the environment of the display panel can pass through at least one section of this display panel. This is the case, for example, if the at least one section is set to a transparent degree of light transmittance. The control device is configured to individually set a respective light transmittance to a predetermined degree for each of the multiplicity of predetermined sections of the display panel. In other words, the control device is configured to set the degree of light transmittance of a respective section independently of the other sections of the display panel.

The degree of light transmittance of the respective predetermined section of the display panel can be set by the control device in such a manner that the respective predetermined section can be set between a transparent state, in which the degree of light transmittance is at least 40% and/or at least 50% and/or at least 60% for example, and an opaque state, in which the degree of light transmittance is less than 30% and/or less than 20% and/or less than 10%. In the transparent state, a space and/or an environment in the field of view of a user behind the display panel may therefore be visible through the display panel in the predetermined section set to the transparent state.

The display apparatus described below provides the advantage that, depending on requirements, the display panel of the display apparatus can appear to be transparent in particular parts or even completely. A user can therefore view an environment of the display panel through the display panel. If the display panel has been set predominantly to a transparent state, the display panel in the field of view of a user can disappear partially or even completely from an optical point of view. A driver of the motor vehicle can therefore be distracted to a lesser extent by the display panel, for example, than if the display panel were to appear in a completely opaque state. This results in the advantage that the user perceives a larger space in the interior of the motor vehicle and can be distracted as little as possible by the display panel.

The display apparatus described below also provides the advantage of providing flexibility when displaying display objects on the display panel since the size of a total area of the display panel which has been switched to a transparent state varies depending on requirements, for example. A larger portion of the predetermined sections is therefore switched to the transparent state when displaying a plurality of display objects on the display panel than when only one display object is displayed on the display panel.

The control device may be configured to set the degree of light transmittance of a respective predetermined section to one of two possible degrees, wherein a first possible degree corresponds to a transparent state of the predetermined section, and wherein a second possible degree corresponds to an opaque state of the predetermined section of the display panel. The degrees of light transmittance which can be set by the control device are therefore binary.

One embodiment provides for the control device to be configured to determine which predetermined sections of the display panel at least partially display the at least one graphical display object. This is because different display contents in the form of at least one graphical display object can be displayed on the display panel depending on the driving operating mode and/or depending on a selected motor vehicle function and/or depending on a selected infotainment system function of the motor vehicle. The control device can determine which predetermined sections of the display panel are overlapped by the graphical display objects displayed on the latter. These determined predetermined sections are controlled by the control device in such a manner that the degree of light transmittance of these sections is lower than in those sections in which a graphical display object is not displayed.

For example, the determined sections are set to a degree of light transmittance which corresponds to an opaque state. The remaining sections which do not display graphical display objects can be set by the control device to a degree of light transmittance which corresponds to a transparent state. The display panel is therefore opaque overall only in those regions in which the graphical display object is at least partially displayed. The determined predetermined sections which are set to the lower degree of light transmittance may individually or together form a surface region on the display panel which completely covers the at least one graphical display object. In this case, the surface region may be larger than the display area occupied by the at least one graphical display object on the display panel. However, the surface region may also have the same size and/or shape as the display area occupied by the at least one graphical display object. Reducing the degree of light transmittance of those sections of the display panel which at least partially display the at least one graphical display object results in the advantage that the at least one graphical display object can be seen particularly well by a user of the display apparatus in the display panel. As a result of the fact that the remaining sections are switched to a transparent state, for example, the environment of the display panel still remains visible in the latter. A clarity in the space therefore remains.

The control device may be configured to reduce the predetermined degree of light transmittance of the at least one determined section when the at least one graphical display object satisfies a significance criterion. The significance criterion may include, for example, the fact that only display contents which are relevant and/or important in a current driving situation and are represented by the at least one display object should be highlighted. For example, the at least one display object is displayed on the display panel with a background which has been switched to a transparent state. If the at least one display object satisfies the significance criterion since it represents an urgent warning or newsflash for example, at least those sections of the display panel which at least partially display the at least one display object are switched to the opaque state. An urgency and/or significance of an item of information represented by the at least one display object can therefore be highlighted.

A further embodiment provides for the control device to be configured to select at least one predetermined section from the multiplicity of predetermined sections of the display panel according to a predetermined selection criterion. The control device is also configured to reduce the predetermined degree of light transmittance of the at least one selected section. For example, the control device is configured to set the at least one selected section to an opaque state. The sections which have not been selected can still be set by the control device to a transparent state. The control device is also configured to determine a display size and/or a display location of the at least one graphical display object in such a manner that a partial area occupied by the at least one displayed graphical display object on the display panel is completely included in the at least one selected predetermined section. In other words, the selected sections are used by the control device to determine in advance those regions of the display panel in which the at least one graphical display object can be displayed.

The selection criterion may relate to a vehicle functional variable, for example a driving operating mode or a function of an infotainment system of the motor vehicle. For example, only a limited number of predetermined sections of the display panel can be selected to display display objects in a manual driving mode of the motor vehicle, whereas all of the multiplicity of predetermined sections of the display panel can be selected in an autonomous or at least partially autonomous driving mode. In the autonomous or partially autonomous driving mode, the entire display panel can be set to the opaque state, for example, in order to display a function of the infotainment system, for example.

However, the selection criterion may also correspond to a personal user setting which can be set by a user. For example, only a limited number of certain sections from all of the multiplicity of sections may be available for further selection by the control device according to a user profile or an operating selection of a user.

Limiting the possible sections of the display panel which can be set to an opaque state results in the advantage that distraction of the user by the display of the graphical display objects is kept as low as possible. This is because, particularly during a journey in a manual operating mode of the motor vehicle, it is more important for the driver to observe traffic events through a windshield than to be distracted by a display content on the display panel of the display apparatus. If the display panel is switched to a predominantly transparent state in the manual operating mode, this distraction remains low. On the other hand, there is no longer any need for particular attention to be paid to traffic events by the driver in an autonomous driving mode of the motor vehicle, with the result that the total area of the display panel can be advantageously used to represent a display content. The driver or a further observer of the display panel can therefore use the best possible comfort which can be provided by the display apparatus.

A further embodiment provides for the display apparatus to have a gaze detection device for detecting a viewing direction of a user on the display panel. For example, the display apparatus has a camera. However, the gaze detection device may also determine the field of view of the user from a voice recognition device in the interior of the motor vehicle, for example. The gaze detection device may be arranged directly on the display panel or in an environment of the display panel, for example in the space in which the display panel stands freely or in a further position inside the motor vehicle. In other words, the gaze detection device is configured to detect which section of the display panel the user has directed his gaze to.

The control device is configured to select a display location of the at least one graphical display object on the basis of the detected viewing direction. In other words, the display location of the at least one graphical display object is selected in such a manner that it is in the user's field of view. Additionally or alternatively, the control device is configured to select the at least one predetermined section on the basis of the detected viewing direction. In other words, the predetermined selection criterion for selecting predetermined sections from the multiplicity of predetermined sections may be based on the predetermined section to be selected being in the user's field of view. This results in the advantage that the graphical display object is displayed in a particularly clear manner for the user. The user need not search the entire display panel for the at least one graphical display object, but rather can perceive the at least one graphical display object at a first glance at the display panel. This makes it possible to save time which would be spent by the user searching for the graphical display object and which the user can therefore instead dedicate to traffic events. This results in the advantage that safety in road traffic and operating comfort for the user of the display apparatus are increased.

A further embodiment provides for the display panel of the display apparatus to have at least two layers which are arranged parallel to one another. The at least two parallel layers can form the display panel when assembled. The at least one first layer is electrically conductive and is designed to display the at least one graphical display object. On account of the electrical conductivity of the at least one first layer, the latter is designed to vary the degree of light transmittance by applying an electrical voltage in this layer. In this case, the electrical voltage can be applied only in a single section or in a selection of predetermined sections of the multiplicity of predetermined sections, with the result that the degree of light transmittance varies only in the sections provided with an electrical voltage. The first layer of the display panel may be, for example, in the form of a thin-film transistor screen or a so-called TFT screen. Contrary to the known practice in the related art, the TFT screen can be designed without a screen backlighting apparatus. An electrical voltage can be applied only in those predetermined sections of the TFT screen which at least partially display the at least one graphical display object. This makes it possible to set these predetermined sections to an opaque state.

The at least one second layer is transparent and is designed to emit light at least in those predetermined sections of the display panel in which the at least one graphical display object is at least partially displayed in the first layer. The at least one second layer is, for example, in the form of a transparent screen having a multiplicity of monochromatic organic light-emitting diodes (OLED). The organic light-emitting diodes may be arranged in a manner distributed over a total area of the transparent screen, with the result that those organic light-emitting diodes which overlap the graphical display object displayed in the first layer are respectively controlled by the control device. Therefore, the at least one graphical display object appears to an observer of the display panel, who perceives the at least one second layer behind the at least one first layer, overall as a light-emitting display object. In other words, the at least one graphical display object displayed in the first layer is illuminated by the at least one organic light-emitting diode in the second layer. This results in the advantage that the at least one display object is displayed on the display panel with a luminosity and can therefore be readily seen by the user. The remaining sections of the display panel can remain in the transparent state, with the result that the remaining display panel does not disrupt the user's field of view. If the first layer is in the form of a TFT screen, for example, the organic light-emitting diodes in the second layer provide the advantage of illuminating colored and black regions in the first layer which are usually output by the TFT screen itself as non-light-emitting. The black values of the light-emitting display object which results overall still do not emit any light, however.

A further embodiment alternatively provides for the at least one first layer to be in the form of a transparent layer and to be configured to display the at least one graphical display object as a transparent luminous image. For example, the at least one first layer is in the form of a transparent OLED screen (T-OLED). The at least one second layer is electrically conductive. The predetermined degree of light transmittance, at least in those predetermined sections of the display panel in which the at least one transparent luminous image is at least partially displayed in the first layer, can be varied by applying an electrical voltage in the respective predetermined section of the second layer. In other words, the second layer is designed to vary a degree of light transmittance in the at least one predetermined section on the basis of an electrical voltage which is applied in this at least one predetermined section. For example, the predetermined section changes from an opaque state to a transparent state if the electrical voltage is applied in the predetermined section. Alternatively, the predetermined section may change from a transparent state to an opaque state if the electrical voltage is applied. The at least one second layer is, for example, in the form of a so-called switchable film. The switchable film is, for example, in the form of a plastic film which is configured to conduct electronic pulses. The switchable film may include, for example, a liquid crystal film which is coated in an electrically conductive manner on both sides and is laminated between two plastic films.

The display panel can therefore be composed of a T-OLED screen which is laminated with the switchable film. The transparent luminous image displayed in the first layer is displayed in the user's field of view overall as a light-emitting graphical display object by the second layer which is switched to an opaque state in the background. In this embodiment, this likewise results in the advantage that the at least one display object is displayed on the display panel with a luminosity and with shielding of an environment in the background of the display object and can therefore be readily seen by the user. The remaining sections of the second layer can be switched to a transparent state, with the result that, together with the transparent first layer, the remaining display panel overall appears to be transparent and therefore does not then disrupt the user's field of view.

When setting the light transmittance of at least one predetermined section of the display panel to a predetermined degree, a further embodiment provides for the control device to be configured to allow the degree of light transmittance of the at least one predetermined section of the display panel to be gradually varied from an initial degree to the predetermined degree of light transmittance to be set. In other words, the control device sets the light transmittance of a predetermined section in such a manner that a fluid or gradual transition between an initial value of the light transmittance and a final value of the light transmittance of this region results. For example, the predetermined section is switched from a transparent state to an opaque state. The control device can then gradually reduce the degree of light transmittance within a predetermined period until the opaque state is reached.

If the at least one predetermined section can be switched only in a binary manner from a transparent state to an opaque state or vice versa, the gradual or fluid transition can be achieved by likewise switching a multiplicity of sections adjacent to the at least one predetermined section from a transparent state to an opaque state or vice versa in succession. The gradual or fluid transition conveys to a user of the display apparatus that switching is being carried out between two different operating modes of the display apparatus, with the result that the user is not surprised by a state change. The operating comfort of the display apparatus is therefore increased.

A motor vehicle may include the display apparatus described below. In this case, the motor vehicle may also have a plurality of such display apparatuses. At least one display apparatus can be arranged in the region of a dashboard and/or a center console and/or a window root region of the motor vehicle. At least one further display apparatus can be arranged in a door region and/or a vehicle seat region. For example, the display apparatus can be arranged in a rear region of a headrest of a vehicle seat.

One embodiment of the motor vehicle provides for the control device of the at least one display apparatus to be configured to set a respective degree of light transmittance of the multiplicity of predetermined sections of the display panel of the display apparatus on the basis of an operating process and/or a motor vehicle function and/or a driving operating mode of the motor vehicle. For example, only a small region of the display panel is switched to an opaque state in a manual driving mode of the motor vehicle, while the remaining region of the display panel is switched to a transparent state. The at least one graphical display object is then displayed only in the region which has been switched to an opaque state. The remaining region of the display panel can therefore remain transparent and can provide the user of the display apparatus with as much feeling of space as possible. For example, a combination instrument of the motor vehicle is displayed in the region which has been switched to an opaque state. A driver of the motor vehicle must therefore look only at this region if he wishes to read an item of information from the combination instrument. The driver is advantageously not distracted by the rest of the display panel.

In an autonomous driving mode of the motor vehicle, the total area of the display panel can then be switched to the opaque state, for example, with the result that the total area can be used to display a film or contents of an Internet website, for example. The display panel can also be in the form of a touchscreen, with the result that the user can select individual contents of the Internet website, for example for purchase. The number of predetermined sections which are switched to an opaque state can be adapted to the respective display content which is displayed. However, the respective display content which is displayed can also be adapted to the predetermined sections which have already been switched to the opaque state, for example to an aspect ratio of the partial area of the display panel which has been switched overall to the opaque state.

A further embodiment provides for the motor vehicle to have a trough-shaped recess in a window root region of the windshield. In other words, there is a depression in the window root region of the motor vehicle. This trough-shaped recess has at least one side wall, wherein the trough-shaped recess is open in the direction of a driver's compartment of the motor vehicle. The trough-shaped recess has, for example, three side walls, wherein the trough-shaped recess is open in the direction of the driver's compartment parallel to that side wall which extends along the window root. The display panel of the display apparatus is arranged inside the trough-shaped recess at a predetermined distance from the at least one side wall. For example, the display panel is arranged at the predetermined distance from that side wall which extends along the window root. The predetermined distance may be at least 10 cm and/or at least 20 cm and/or at least 30 cm. The display panel can be arranged parallel to the side wall. From the perspective of a driver's seat, the at least one side wall is arranged behind the display panel. Therefore, the side wall is visible in the display panel in a transparent section of the display panel. However, only one section of the display panel may also be arranged in the trough-shaped recess. For example, the trough-shaped recess may also be open in the direction of the window root. From the perspective of a driver, an environment in front of the motor vehicle can then be perceived through the display panel on the windshield.

The trough-shaped recess may have a lining made of wood, for example. Furthermore, the display panel may be arranged in the trough-shaped recess in such a manner that an upper edge of the display panel does not project beyond the at least one side wall of the trough-shaped recess. Therefore, a view of the windshield is not disrupted by the display panel. From the field of view of the driver's seat, the display panel is below the windshield in the lower-lying trough-shaped recess. This arrangement of the display panel of the display apparatus in the motor vehicle makes it possible to provide a display apparatus for a driver of the motor vehicle with little distraction. The distance between the at least one side wall and the display panel also gives the optical impression of a large space between the driver's seat and the windshield, with the result that the driver does not have any restrictive or confining feeling of space.

A further embodiment provides for the trough-shaped recess to be open in the direction of the windshield, with the result that the windshield is visible in the display panel arranged inside the trough-shaped recess. An environment of the motor vehicle can therefore be perceived through the display panel and through the windshield from a viewing angle of a driver of the motor vehicle who directs his gaze to the display panel. This increases the driver's subjectively perceived feeling of space since there is no restriction to a field of view of the windshield by the display panel.

A further embodiment provides for the trough-shaped recess and/or a longitudinal direction of the display panel to extend at least partially or completely over a total length of the window root. An entire width of an interior of the motor vehicle and/or of the windshield can therefore be used to display different graphical display objects on the display panel. Depending on requirements, display contents can be displayed on the display panel in the region immediately in front of a driver's seat and/or in front of a passenger seat. The trough-shaped recess and/or the longitudinal direction of the display panel can also extend from the window root along a side region of the motor vehicle, for example a door region of the motor vehicle. The display panel can also extend inside the motor vehicle in a manner running around the vehicle.

A further embodiment provides for a shelf and/or a further display panel to be arranged between the at least one side wall of the trough-shaped recess and the display panel of the display apparatus. The space between the at least one side wall and the display panel can therefore be expediently used. If two display panels are arranged behind one another in the space, a three-dimensional display image can also be created by displaying different graphical display objects in the first and second display panels in a manner offset with respect to one another. This enables a variety of possible display options.

A further embodiment provides for the display panel to be movably mounted in at least one spatial direction. The control device of the display apparatus is designed to control a movement of the display panel in the at least one spatial direction on the basis of an operating process and/or a motor vehicle function and/or a driving operating mode of the motor vehicle. The display panel is movably mounted, for example, parallel to a longitudinal axis and/or a transverse axis and/or a vertical axis of the motor vehicle. However, the display panel may also be rotated about its own axis. For example, the display panel may be moved inside the trough-shaped recess by the control device in such a manner that the distance between the at least one side wall and the display panel varies. Furthermore, the display panel can be moved out of the trough-shaped recess, for example during an autonomous driving mode, with the result that the display panel partially overlaps the windshield. During a transition to a manual driving mode, the display panel can then be moved into the trough-shaped recess again, with the result that the display panel does not disrupt the view of the windshield. The movable mounting of the display panel in at least one spatial direction results in a variety of possible usage options for the display apparatus which can be selected depending on user requirements.

The developments of the motor vehicle include features which have already been described in connection with the developments of the display apparatus. For this reason, the corresponding developments of the motor vehicle are not described again here. The developments of the display apparatus analogously apply to the motor vehicle.

BRIEF DESCRIPTION OF THE DRAWINGS

These and other aspects and advantages will become more apparent and more readily appreciated from the following description of the exemplary embodiments described below, taken in conjunction with the accompanying drawings of which.

DETAILED DESCRIPTION

The exemplary embodiments explained below are preferred embodiments. In the exemplary embodiments, the described components of the embodiments are each individual features which should be considered independently of one another and which each also develop the display apparatus independently of one another and therefore can also be considered individually or in a combination other than that shown. Furthermore, the described embodiments can also be supplemented with further features which have already been described.

In the figures, identical reference signs respectively denote functionally identical elements.

Figure 1:
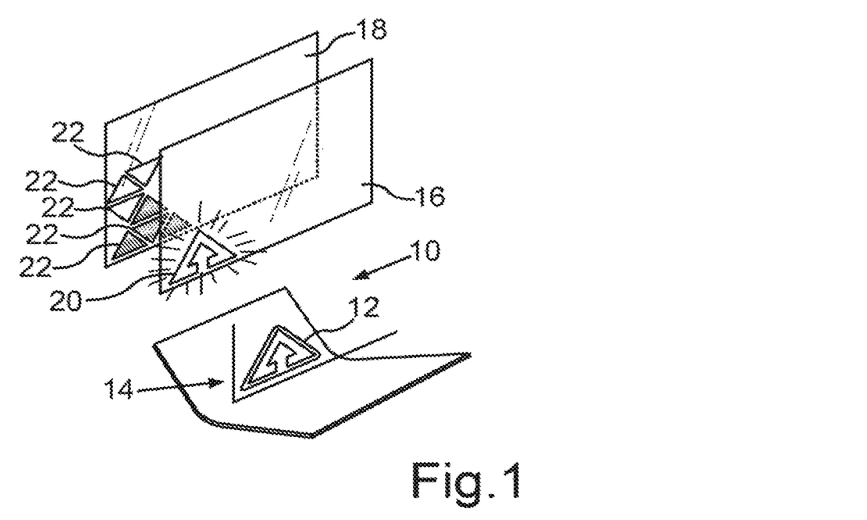
FIG. 1 is a schematic perspective view of an only partially illustrated display panel having a graphical display object and a composition of the display panel in two layers.

A lower region of FIG. 1 schematically illustrates only a section of a display panel 10 which displays a graphical display object 12 on a transparent background. In this case, the graphical display object 12 is displayed as a logo for artificial intelligence in the form of a triangle. With the exception of the region which shows the graphical display object 12, the display panel 10 is transparent, with the result that an environment 14 of the display panel 10 can be seen in the display panel 10. That region of the display panel 10 which is occupied by the graphical display object 12 is opaque. The display panel 10 is part of a display apparatus which controls a display content to be displayed on the display panel 10 by a control device.

The display panel 10 is composed of two layers 16 and 18. This is illustrated in the upper region of FIG. 1 (and accordingly also in FIG. 2 and FIG. 3) in an exploded illustration of the two layers 16 and 18. The first layer 16 is in the form of a transparent OLED screen. It is designed to display at least one graphical display object 12 as a transparent luminous image 20. In other words, the transparent OLED screen emits light in at least one predetermined color as a graphical display object 12. The transparent OLED screen is laminated with a second layer 18 which is in the form of a switchable film. The switchable film is electrically conductive and is subdivided into a multiplicity of predetermined sections 22. Illustrated here, a predetermined section 22 has the shape of a triangle, wherein all triangles, when put together, can form the total area of the switchable film. However, the predetermined section 22 may also have the shape of a square and/or a rectangle and/or a hexagon and/or any desired geometrical figure.

The individual predetermined sections 22 can be switched by the control device of the display apparatus, with the result that an electrical voltage can be applied only in one section or in a selection of the multiplicity of predetermined sections 22. Depending on the applied voltage, the predetermined section 22 changes from a transparent state to an opaque state. In this case, a transparent state has a transparency of at least 40% and/or at least 50% and/or at least 60%. An opaque state has an opacity of at least 70% and/or at least 80% and/or at least 90%. The predetermined sections 22 which are switched to an opaque state by the control device are selected in such a manner that they at least partially overlap the transparent luminous image displayed on the transparent OLED screen. Illustrated here, four triangles which each form a predetermined section 22 are switched to the opaque state, with the result that the four triangles, when put together, form a triangular area which corresponds to the triangular area of the transparent luminous image on the transparent OLED screen. A graphical display object 12 can therefore be seen overall on the display panel 10 which is formed by the transparent OLED screen and the switchable film, wherein only the background of the display object 12 is opaque. The remaining display panel 10 is transparent. Since the OLED screen cannot output a display in black, those sections of the graphical display object 12 which should be displayed in black can be output by the OLED screen as transparent regions which then appear to be black overall by virtue of the film which has been switched to an opaque state in the background.

Figure 2:
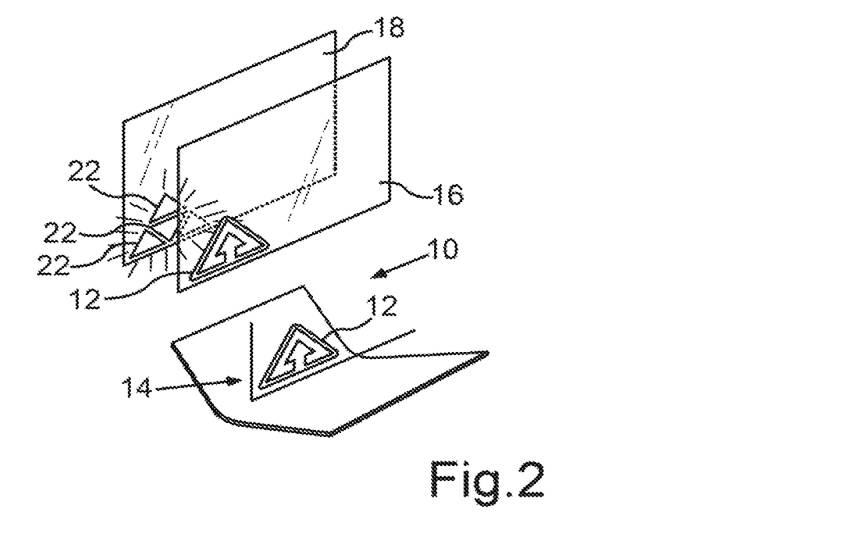
FIG. 2 is a schematic illustration, like in FIG. 1, in a different embodiment.

FIG. 2 illustrates an alternative embodiment of the display panel 10. As the end result, this displays the same graphical display object 12 as in the embodiment illustrated in FIG. 1. However, the first and second layers 16 and 18 of the display panel 10 are different. The first layer 16 is in the form of a TFT screen which does not have any backlighting. The TFT screen is configured to display the graphical display object 12 in an opaque form. The regions of the TFT screen outside the graphical display object 12 are transparent. The second layer 18 of the display panel 10 is in the form of a transparent screen having monochromatic organic light-emitting diodes. The monochromatic organic light-emitting diodes are arranged over a total area of the transparent screen in such a manner that a predetermined section 22 of the transparent screen respectively emits light through the monochromatic organic light-emitting diodes. Triangular sections 22 which can each be individually switched to a light-emitting or non-light-emitting state can likewise be formed here in the second layer. FIG. 2 illustrates four triangular sections 22 as light-emitting sections which correspond to that region of the TFT screen in which the graphical display object 12 is displayed. As the end result, the graphical display object 12 is illuminated by the organic light-emitting diodes which emit light in the background of the graphical display object 12. As the end result, a light-emitting and opaque display object 12 is therefore visible on the display panel 10.

Figure 3:
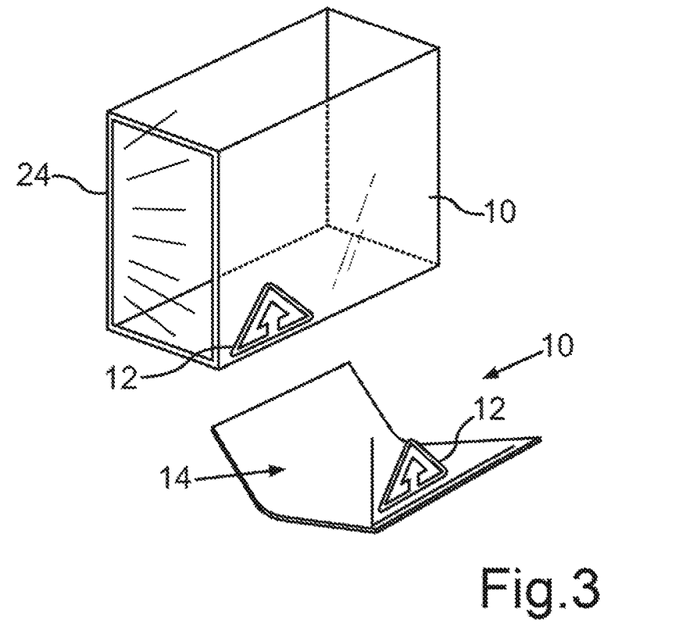
FIG. 3 is a schematic illustration, like in FIG. 1 and FIG. 2, in a further different embodiment.

FIG. 3 illustrates a third embodiment for displaying a graphical display object 12 on a transparent display panel 10 like in FIGS. 1 and 2. In this case, the display panel 10 is in the form of a TFT screen, like in FIG. 2, the background of which is illuminated by an illumination device 24. The illumination device 24 has the form of a box, for example, within which the TFT screen is accommodated. The graphical display object 12 displayed on the TFT screen is illuminated in the background by the illumination device 24.

The three embodiments of the display panel 10 which are described in FIGS. 1, 2 and 3 therefore each provide a display panel 10 for a display apparatus which can image at least one graphical display object 12 on a transparent background. The following FIGS. 4, 5, 6 and 7 schematically illustrate a possible way of arranging the display panel 10 in a motor vehicle 26. In this case, the figures show a perspective view of an only partially illustrated interior of the motor vehicle 26. A window root 28 of the motor vehicle 26 has a trough-shaped recess 30. In other words, the region directly below the windshield of the motor vehicle 26 has a depression. The trough-shaped recess 30 has at least one side wall 32 which, as illustrated here, extends along a width of the windshield. The trough-shaped recess 30 may also have two further side walls 32 in a respective vehicle door region. Illustrated here, the trough-shaped recess 30 is lined with wood.

Figure 4:
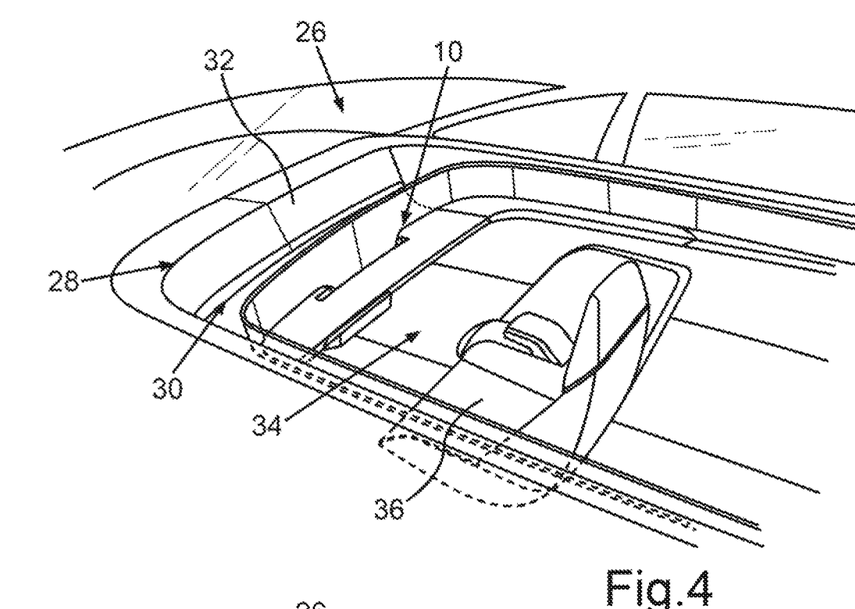
FIG. 4 is a perspective view of an only partially schematically illustrated vehicle interior of a motor vehicle having a display panel arranged in a trough-shaped recess.
Figure 5:
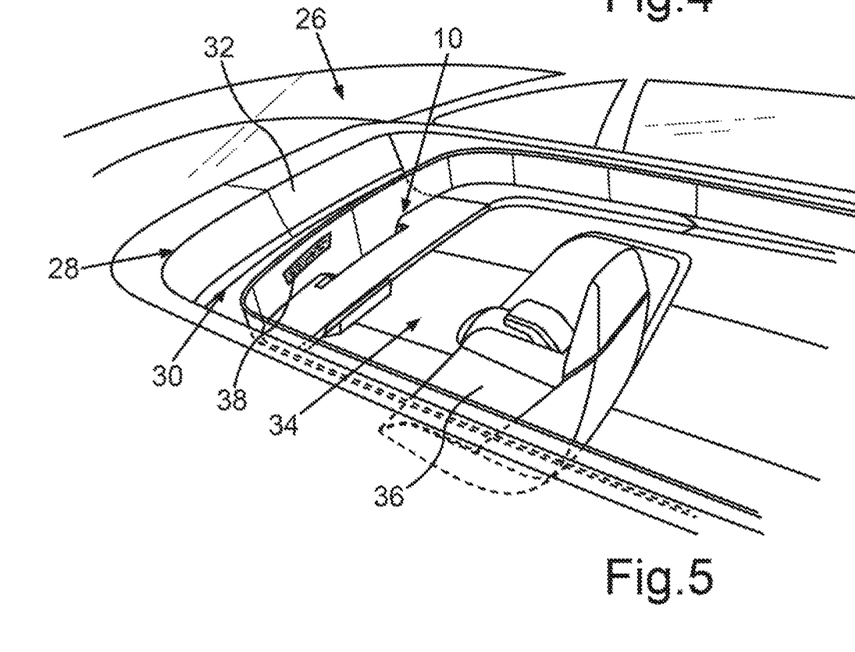
FIG. 5 is a partially schematic illustration, like in FIG. 4, with a combination instrument displayed on the display panel.

The trough-shaped recess 30 is open towards a driver's compartment 34. The display panel 10 of the display apparatus is arranged inside the trough-shaped recess 30, wherein a total area of the display panel 10 is parallel to the side wall 32 and parallel to the side which is open to the driver's compartment. As seen from a driver's seat 36, the display panel 10 can therefore be perceived without concealment in the trough-shaped recess 30. The display panel 10 is arranged at a predetermined distance from the at least one side wall 32. Furthermore, the display panel 10 is arranged at a predetermined distance from the open side. The respective predetermined distances may be at least 10 cm. An entire dashboard of the motor vehicle 26 can therefore be formed by the trough-shaped recess 30 and the display panel 10.

In FIG. 4, the total area of the display panel 10 is transparent and all predetermined sections 22 of the display panel 10 are therefore switched to a transparent state. The entire environment 14 of the display panel 10 can be seen in the display panel 10. This entire transparent switching of the display panel 10 may be set by the control device, for example in an idle mode of the motor vehicle 26, for example when the motor vehicle 26 is parked or switched off.

Depending on the driving operating mode or a function performed by an infotainment system of the motor vehicle 26, different predetermined sections 22 of the display panel 10 can be switched to an opaque state by the control device, with the result that different graphical display objects 12 can be displayed in these sections 22. The motor vehicle 26 is operated in a manual driving mode in FIG. 5, for example. In this case, it is important for a driver to be provided with a combination instrument 38. Further display contents are less important to the driver since the driver should direct his main focus to traffic events in the environment of the motor vehicle 26. In this manual driving mode, a comparatively small region of the display panel 10 in the driver's field of view is switched to an opaque state, in which region graphical display objects 12 of the combination instrument 38 are displayed. The remaining display panel 10 is switched to a transparent state.

Figure 6:
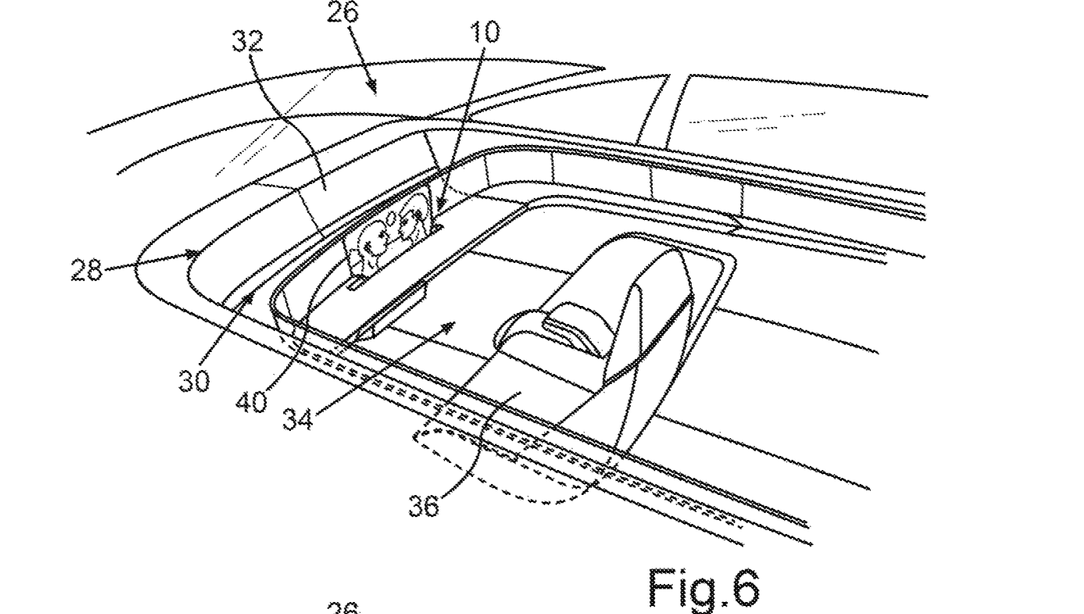
FIG. 6 is a partially schematic illustration, like in FIG. 4, with a film displayed on the display panel.

The motor vehicle 26 is operated in an autonomous driving mode in FIG. 6. The control device detects that a display of a film 40 on the display panel 10 has been selected by the user, for example. The control device determines which predetermined sections 22 of the display panel 10 at least partially display the film 40 and switches only these sections 22 to the opaque state. The remaining sections 22 are switched to the transparent state. A user can also set, for example, a display size and/or a display location of the film 40. The control device adapts the selection of the predetermined sections 22, which are switched to the opaque state, to the display size and/or the display location of the film 40.

Figure 7:
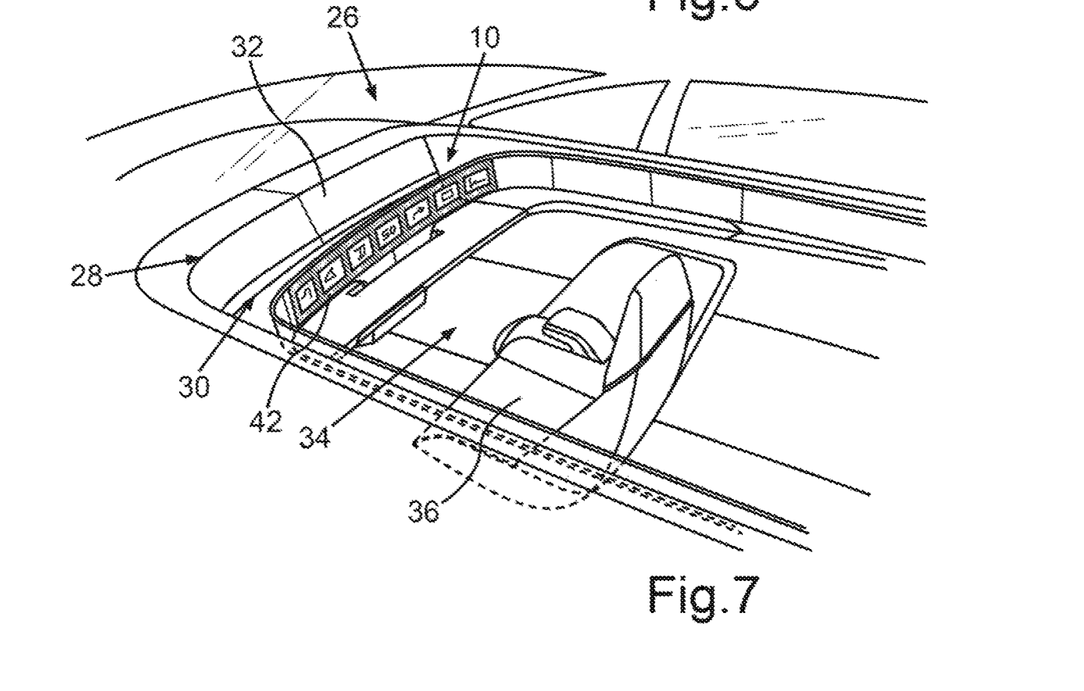
FIG. 7 is a partially schematic illustration, like in FIG. 4, with an Internet website displayed on the display panel.

The motor vehicle 26 is likewise operated in the autonomous driving mode in FIG. 7. The user has selected, for example, that a website content 42 should be displayed on the display panel 10. In order to display this website content 42 as clearly as possible, the control device switches the total area of the display panel 10 to an opaque state in order to display the website content 42 on the entire area. In the autonomous driving mode, the driver can turn his entire attention to the display content of the display panel 10 since it is less important to permanently observe the traffic events.

Figure 8:
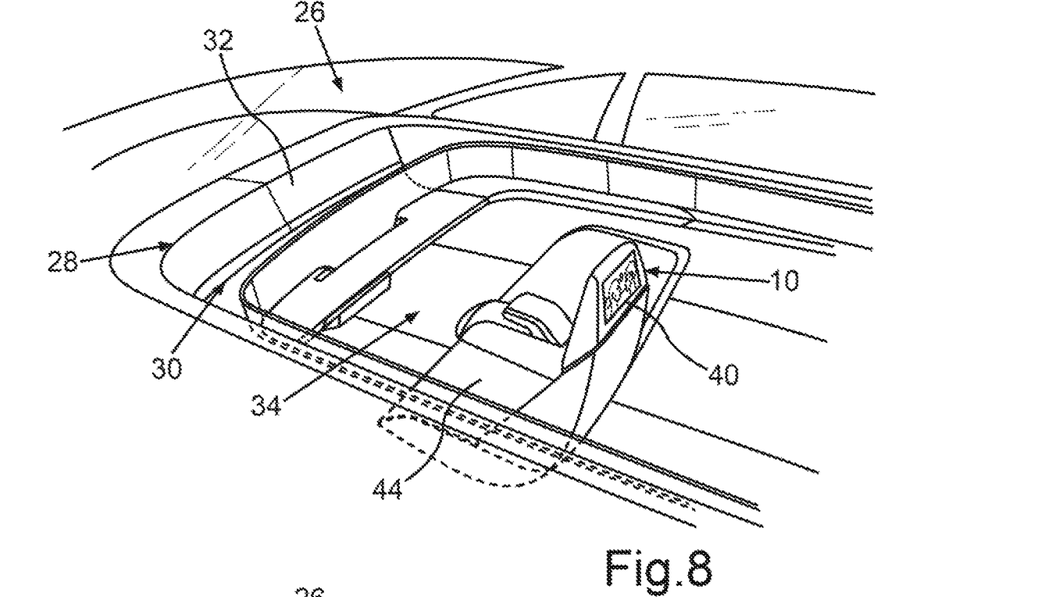
FIG. 8 is a partially schematic illustration, like in FIG. 4, with a further display panel on an only partially illustrated vehicle seat of the motor vehicle.
Figure 9:
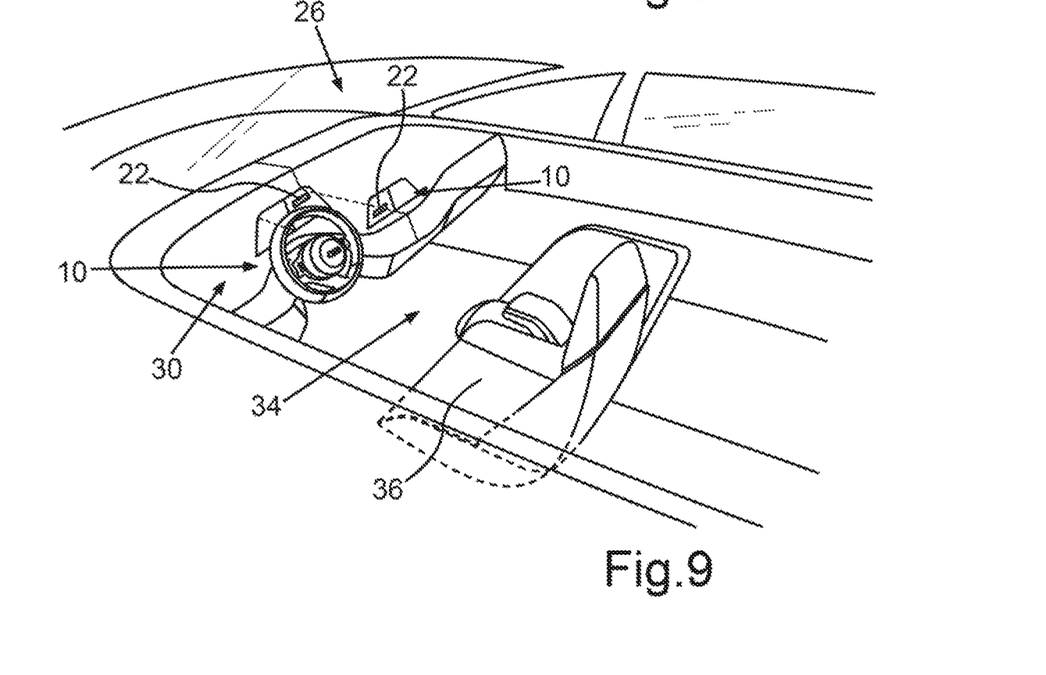
FIG. 9 is a perspective view of an only partially schematically illustrated vehicle interior of a motor vehicle having an arrangement of two display panels in a dashboard region of a motor vehicle.

FIG. 8 and FIG. 9 each illustrate further alternative possible ways of arranging the display panel 10 in the motor vehicle 26. In this case, FIG. 8 shows, from a perspective view, a vehicle seat 44 having a headrest region on which a further display panel 10 of the display apparatus is arranged. For example, the display panel 10 is integrated in the headrest region. Illustrated here, a film 40 is displayed on the display panel 10. The vehicle seat 44 may be a driver's seat 36 or a passenger seat of the motor vehicle 26.

FIG. 9 shows a perspective view of a dashboard of the motor vehicle from the perspective of the interior of the motor vehicle 26. In this case, a display panel 10 is arranged in a region behind the steering wheel of the motor vehicle 26 and a further display panel 10 is arranged in a region of a center console. The respective display panels 10 can display different display contents. Illustrated here, a predetermined section 22 is switched to an opaque state on each display panel 10.

Figure 10:
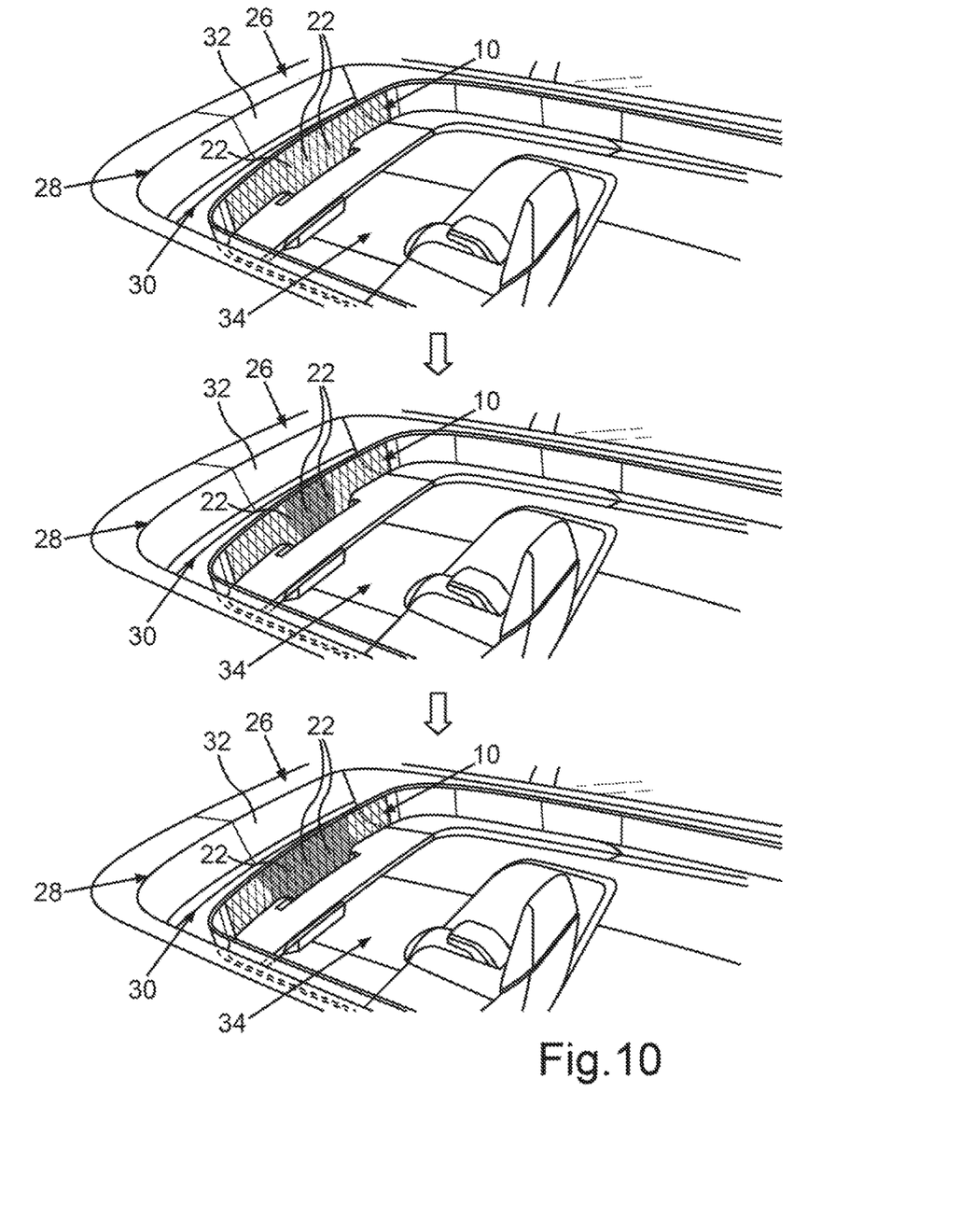
FIG. 10 is a partially schematic illustration of three display panels, like in FIG. 4, each with a multiplicity of predetermined sections which are each switched to a transparent or an opaque state.

FIG. 10 schematically illustrates three display panels 10 from a perspective view like in FIG. 4. In this case, all predetermined sections 22, into which the display panel 10 is subdivided, can be seen in the display panels 10 in FIG. 10. Each of the predetermined sections 22 can be individually switched between a transparent state and an opaque state by the control apparatus. In order to gradually switch at least one portion of the total area of the display panel 10 to an opaque state on a display panel 10 which has been switched to a completely transparent state, for example, the individual predetermined sections 22 can be switched from the transparent state to the opaque state in temporal succession. In this respect, FIG. 10 shows three snapshots of the display panel 10 during the gradual transition from a completely transparent state of the display panel, as illustrated in the uppermost figure of FIG. 10, to a display panel 10 which has been mainly switched to an opaque state, as illustrated in the lowermost figure of FIG. 10. The middle figure of FIG. 10 shows an intermediate transitional phase between the two states, in which only one portion of the predetermined sections 22 has already been switched to an opaque state.

Figure 11:
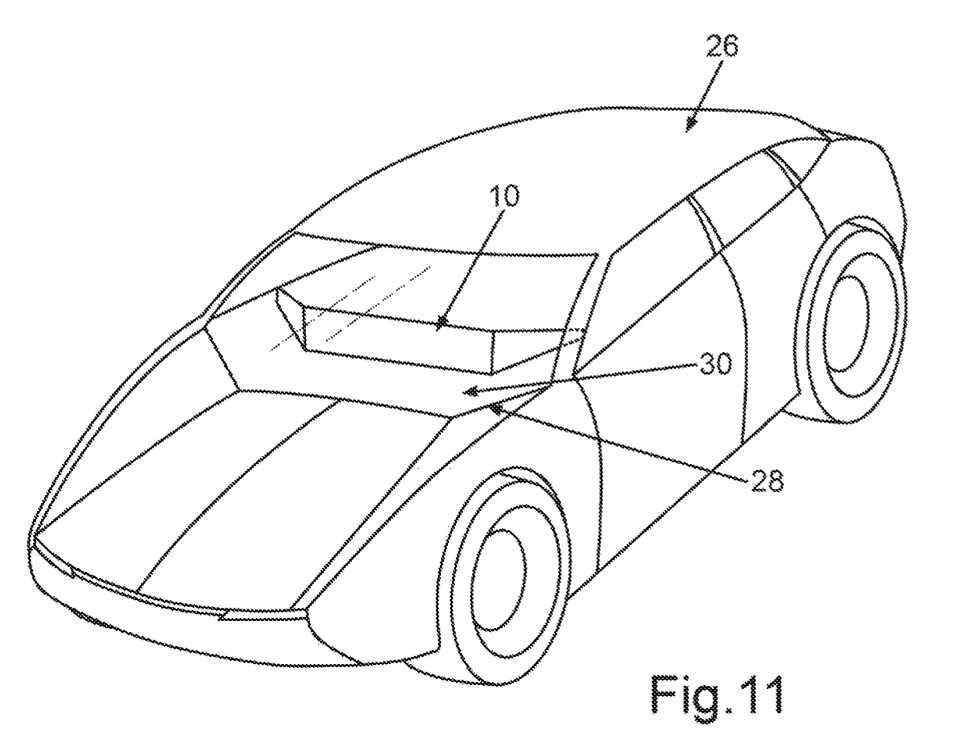
FIG. 11 is a perspective view of a schematically illustrated motor vehicle having a display panel arranged in a trough-shaped recess.

FIG. 11 schematically illustrates the motor vehicle 26 from a front perspective view, wherein the display panel 10, as illustrated in FIGS. 4 to 7, is arranged in this embodiment inside a trough-shaped recess 30 in the window root region 28 of the motor vehicle 26. However, the trough-shaped recess 30 differs from FIGS. 4 to 7 in that not only one side of the trough-shaped recess 30 is open in the direction of the driver's seat 36, but also a side in the direction of the windshield of the motor vehicle 26. The trough-shaped recess 30 therefore has only two side walls 32 which are each on a vehicle door side of the motor vehicle 26. The windshield of the motor vehicle 26 has the special feature that its lower edge is pulled downward in comparison with known windshields in order to enable a view of the environment in front of the motor vehicle 26 if a motor vehicle occupant looks through the at least one predetermined section of the display panel 10 which has been switched to a transparent state. In other words, a shape of the windshield is adapted to the trough-shaped recess 30. A depth of the windshield can then correspond to a depth of the trough-shaped recess 30.

Overall, the examples show how the display apparatus for a motor vehicle described above makes it possible to reduce an actual and optically perceived space restriction of an interior of the motor vehicle and, at the same time, provides a clear display of display contents.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:

1. A display apparatus for a motor vehicle having an interior with a driver's compartment and a dashboard having a trough-shaped recess with at least one side wall in a window root region, the trough-shaped recess being open towards the driver's compartment, and an exterior viewable through at least a windshield, comprising:
    a display panel, arranged inside the trough-shaped recess at a predetermined distance from the at least one side wall, whereby at least sections of the at least one side wall of the trough-shaped recess are visible through the display panel, displaying at least one graphical display object, the display panel being divided into predetermined sections, each having a degree of light transmittance, the display panel being unsupported in front and behind so that at least one portion of the interior is visible to a seated occupant through the display panel depending on the degree of light transmittance; and
    a control device configured to individually set a respective light transmittance to a predetermined degree for each of the predetermined sections of the display panel.

2. The display apparatus according to claim 1, wherein the control device is further configured to
    determine at least one first predetermined section of the display panel to at least partially display the at least one graphical display object, and
    set the predetermined degree of the respective light transmittance of the at least one first predetermined section to a lower light transmittance than a higher light transmittance of at least one second predetermined section not displaying the at least one graphical display object.

3. The display apparatus according to claim 2, wherein the control device is further configured to reduce the predetermined degree of the respective light transmittance of the at least one first predetermined section when the at least one graphical display object satisfies a significance criterion.

4. The display apparatus according to claim 1, wherein the control device is further configured to
    determine at least one selected section from the predetermined sections of the display panel according to a predetermined selection criterion,
    reduce the predetermined degree of the respective light transmittance of the at least one selected section, and determine at least one of a display size and a display location of the at least one graphical display object so that a partial area occupied by the at least one displayed graphical display object on the display panel is completely included in the at least one selected section.

5. The display apparatus according to claim 4, further comprising a gaze detection device for detecting a viewing direction of a user on the display panel, and wherein the control device is further configured to select at least one of the display location of the at least one graphical display object and the at least one selected section based on the viewing direction.

6. The display apparatus according to claim 1, wherein the display panel of the display apparatus has at least two layers arranged parallel to one another, wherein at least one first layer is electrically conductive and displays the at least one graphical display object, wherein the predetermined degree of the respective light transmittance of a respective predetermined section of the display panel is varied by applying an electrical voltage in the respective predetermined section of the at least one first layer, and wherein at least one second layer is transparent and emits light at least in the at least one first predetermined section of the display panel, whereby the at least one graphical display object is displayed on the display panel as a light-emitting display object.

7. The display apparatus according to claim 1, wherein the display panel of the display apparatus has at least two layers arranged parallel to one another, wherein at least one first layer is transparent and is designed to display the at least one graphical display object as a transparent luminous image, wherein at least one second layer is electrically conductive, and wherein the predetermined degree of the respective light transmittance is varied at least in the at least one first predetermined section of the display panel in which the at least one transparent luminous image is at least partially displayed in the first layer by applying an electrical voltage in the respective predetermined section of the second layer, whereby the at least one graphical display object is displayed on the display panel as a light-emitting display object.

8. The display apparatus according to claim 1, wherein, when setting the respective light transmittance of the at least one first predetermined section of the display panel to the predetermined degree, the control device is configured to gradually vary the degree of light transmittance of the at least one first predetermined section of the display panel from an initial degree to the predetermined degree.

9. The display apparatus according to claim 1, wherein at least one portion of the exterior of the motor vehicle is visible through the display panel depending on the degree of light transmittance.

10. The display apparatus according to claim 1, wherein the at least one portion of the interior is visible through the display panel to the seated occupant in a driver's seat.

11. A motor vehicle having an exterior, comprising:
an interior cabin with a driver's compartment, at least a windshield having a view of the exterior of the motor vehicle, and a dashboard having a trough-shaped recess with at least one side wall in a window root region, the trough-shaped recess being open towards the driver's compartment; and
at least one display apparatus arranged in one of the dashboard, the center console, the window root, the vehicle door and the vehicle seat of the motor vehicle, including
a display panel, arranged inside the trough-shaped recess at a predetermined distance from the at least one side wall, whereby at least sections of the at least one side wall of the trough-shaped recess are visible through the display panel, displaying at least one graphical display object, the display panel being divided into predetermined sections, each having a degree of light transmittance, the display panel being unsupported in front and behind so that at least one portion of the interior cabin is visible to a seated occupant through the display panel depending on the degree of light transmittance; and
a control device configured to individually set a respective light transmittance to a predetermined degree for each of the predetermined sections of the display panel.

12. The motor vehicle according to claim 11, wherein the control device of the at least one display apparatus is further configured to set the respective degree of light transmittance of the predetermined sections of the display panel of the display apparatus based on at least one of an operating process, a motor vehicle function and a driving operating mode of the motor vehicle.

13. The motor vehicle according to claim 11, wherein the trough-shaped recess is open towards the windshield, whereby the exterior of the motor vehicle is visible through the windshield and the display panel.

14. The motor vehicle according to claim 11, wherein at least one of the trough-shaped recess and a longitudinal direction of the display panel extends at least partially over a total length of the window root.

15. The motor vehicle according to claim 11, further comprising at least one of a shelf and a further display panel arranged between the at least one side wall of the trough-shaped recess and the display panel of the display apparatus.

16. The motor vehicle according to claim 11, wherein the display panel is movably mounted in at least one spatial direction, and wherein the control device of the display apparatus is further configured to control movement of the display panel in the at least one spatial direction based on at least one of an operating process, a motor vehicle function and a driving operating mode of the motor vehicle.

17. The motor vehicle according to claim 11, wherein at least one portion of the exterior of the motor vehicle is visible through the display panel depending on the degree of light transmittance.

18. The motor vehicle according to claim 11, wherein the at least one portion of the interior is visible through the display panel to the seated occupant in a driver's seat.

* * * * *